Feb. 3, 1959        C. W. HEDSTROM        2,872,203
CONVERTIBLE AND FOLDABLE BABY VEHICLES
Filed Feb. 24, 1958        3 Sheets-Sheet 1
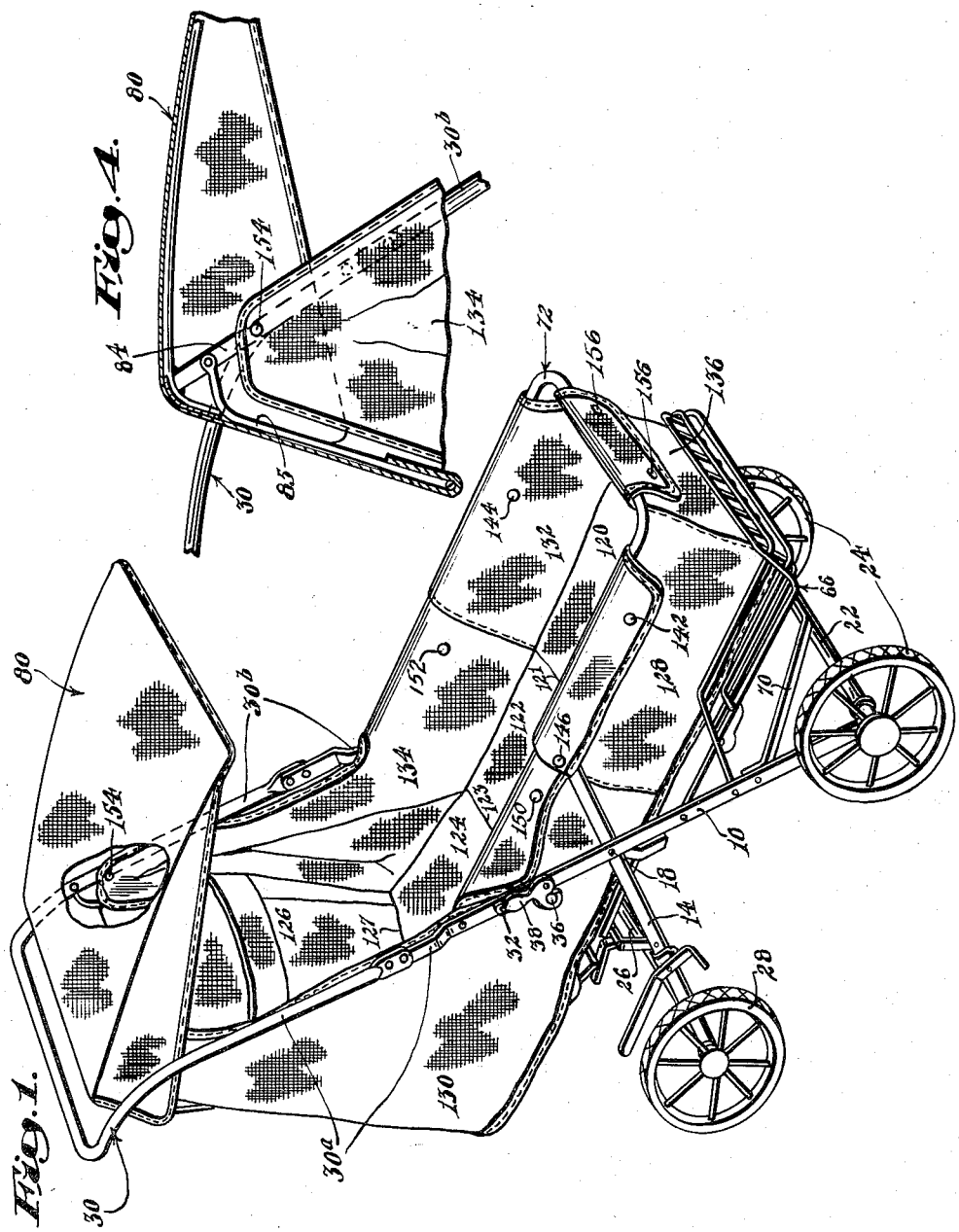
Inventor:
Carl W. Hedstrom
by John H. W. Kenna
Attorney Feb. 3, 1959     C. W. HEDSTROM     2,872,203
CONVERTIBLE AND FOLDABLE BABY VEHICLES
Filed Feb. 24, 1958     3 Sheets-Sheet 2
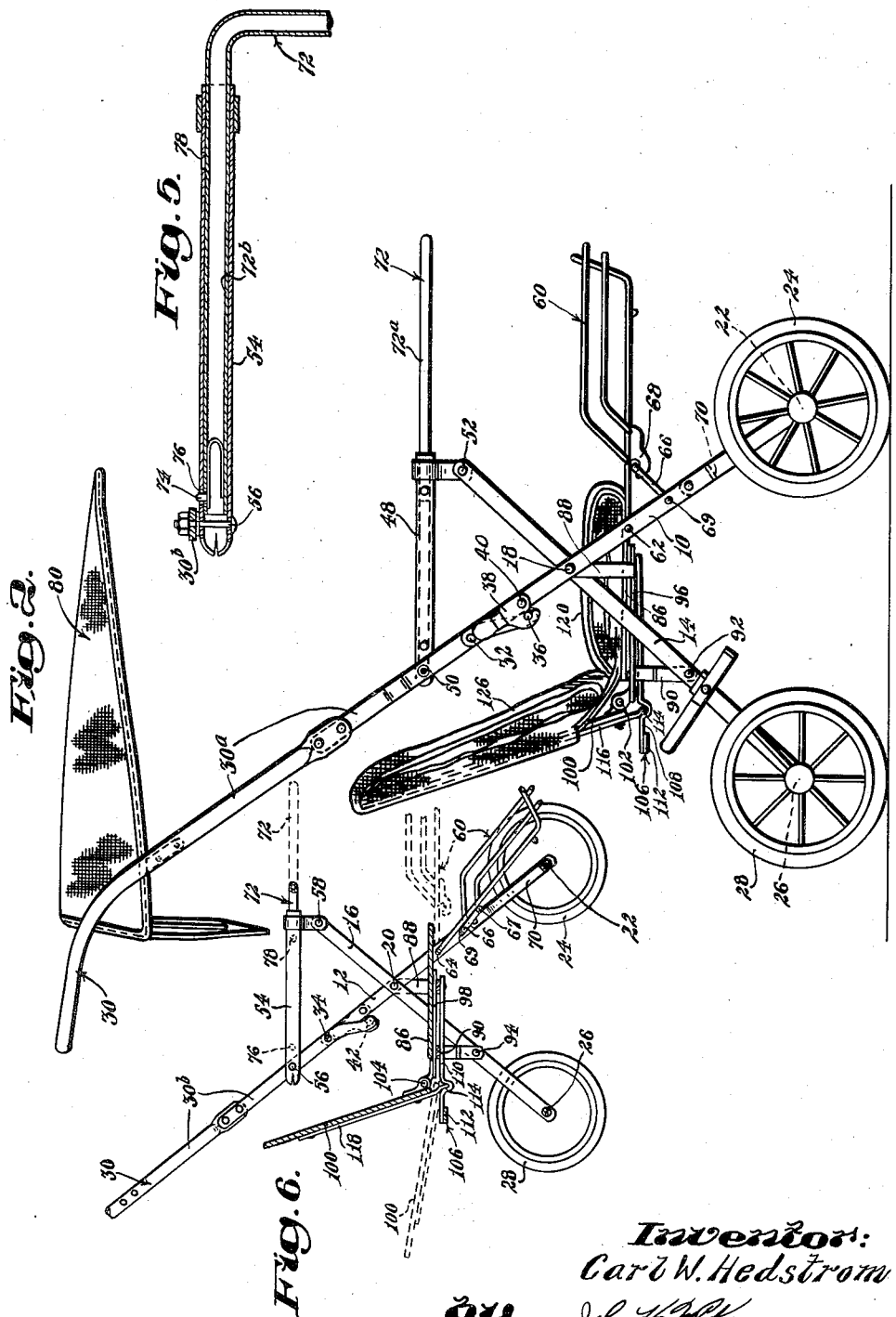
Inventor:
Carl W. Hedstrom
by John K. McKenna
Attorney Feb. 3, 1959 C. W. HEDSTROM 2,872,203
CONVERTIBLE AND FOLDABLE BABY VEHICLES
Filed Feb. 24, 1958 3 Sheets-Sheet 3
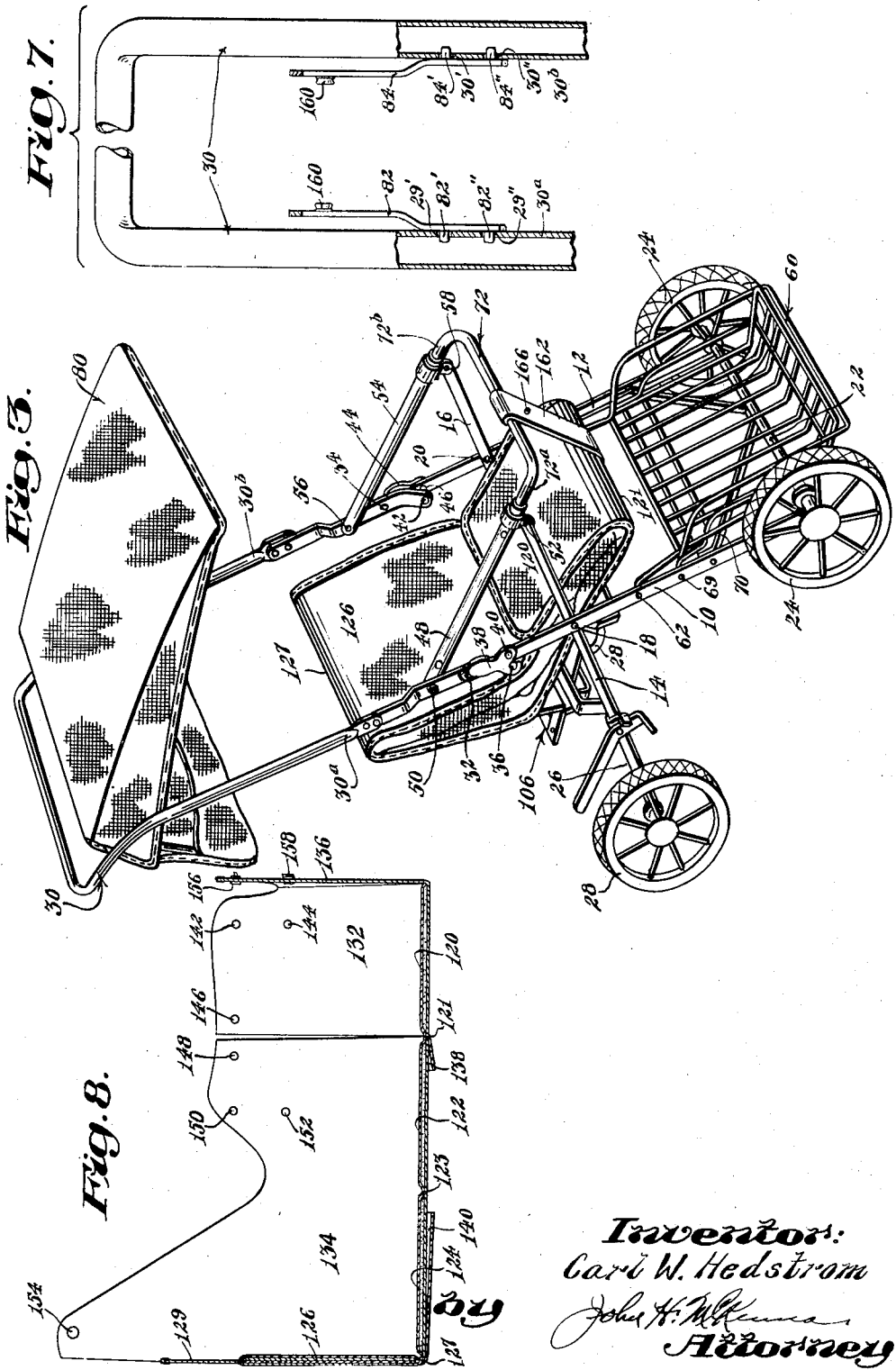
Inventor:
Carl W. Hedstrom
John H. McKenna
Attorney

United States Patent Office 2,872,203
Patented Feb. 3, 1959

2,872,203

CONVERTIBLE AND FOLDABLE BABY VEHICLES

Carl W. Hedstrom, Gardner, Mass., assignor to Hedstrom Union Company, Fitchburg, Mass., a corporation of Massachusetts Application February 24, 1958, Serial No. 716,939

4 Claims. (Cl. 280—41)

This invention relates to improvements in convertible and foldable baby vehicles. More particularly, the invention provides an improved baby vehicle which, in one operative condition, has the characteristics of a protectively enclosed baby carriage and which readily and quickly may be converted into a stroller which may be collapsed or folded, at will, in a conventional manner.

It is among the objects of the invention to provide a baby vehicle chassis and frame structure wherein portions are selectively adjustable between baby carriage positions and stroller positions, and wherein flexible sheet material and padded sections constitute a carriage body unit which is readily removable from the frame, for laundering and replacement purposes, and foldable to provide a padded seat and back member of a stroller when said adjustable portions of the chassis and frame structure are in their said stroller positions.

Another object of the invention is to provide a baby vehicle which is readily convertible for constituting an enclosed baby carriage or a non-enclosed stroller, and wherein a body unit of flexible material and padded sections is removable from the vehicle frame and is foldable to constitute only a padded seat portion and a padded back rest portion when the vehicle is converted into a stroller.

Yet another object of the invention is to provide a baby vehicle which is readily convertible from an enclosed baby carriage into a non-enclosed stroller, and wherein a stroller foot rest is adjustable to an elevated position in which it may serve to support the forward portion of a baby carriage body unit when the vehicle is conditioned for constituting a baby carriage.

It is, moreover, a purpose and general object of the invention to improve the structure and utility of baby vehicles and specifically such vehicles of the convertible and folding varieties.

In the accompanying drawings:

Fig. 1 is a perspective view of a baby carriage embodying features of the invention;

Fig. 2 is a side elevation of the vehicle of Fig. 1 partially converted for serving as a stroller;

Fig. 3 is a perspective view of the vehicle of Figs. 1 and 2 in fully converted stroller condition;

Fig. 4 is an enlarged fragmentary cross-sectional view through the mounted portion of the vehicle canopy, and showing one upper snap-securement of the body side wall portion of the carriage body unit;

Fig. 5 is a further enlarged cross-sectional view of one of the side frame members within which an arm of the forward tubular U-member is telescopically adjustable;

Fig. 6 is a side elevation of the bare chassis and frame structure, in medial cross-section, and on a scale smaller than that of Figs. 1, 2 and 3, the foot rest and back rest members being shown by full lines in their stroller positions and, by broken lines, in their baby carriage positions;

Fig. 7 is a fragmentary elevational view of upper portions of the pusher handle, with portions in cross-section for more clearly illustrating the canopy mounting means; and Fig. 8 is a somewhat diagrammatic elevational view, in medial cross-section through the baby carriage body unit apart from the vehicle chassis and frame.

Referring to the drawings, the frame of the improved vehicle, as best seen in Figs. 2 and 3, comprises a pair of frame elements 10, 12 and a pair of frame elements 14, 16 of which the elements 10, 14 are pivotally connected at 18, in crossing relation, at one side of the vehicle, and the elements 12, 16 similarly are pivotally connected at 20, in crossing relation, at the other side of the vehicle. The lower ends of elements 10, 12 are connected to front axle 22 which has wheels 24 thereon, and the lower ends of elements 14, 16 are connected to rear axle 26 which has wheels 28 thereon.

An inverted U-shaped frame member, indicated generally at 30, has one of its U-arms 30a pivotally connected at 32 to the upper end of element 10, and has its other U-arm 30b pivotally connected at 34 to the upper end of element 12. The pivots 32, 34 are spaced appreciably from the ends of U-arms 30a, 30b, respectively, and a lug 36 on the end of U-arm 30a coacts with a latch member 38, pivoted at 40 on element 10, for releasably securing together the U-arm 30a and element 10 with the element 10 serving as a rigid extension of U-arm 30a. Similarly, a lug 42 on the end of U-arm 30b coacts with a latch member 44, pivoted at 46 on element 12, for releasably securing together the U-arm 30b and element 12 with the element 12 serving as a rigid extension of U-arm 30b. Each latch member has a notched portion for engaging around the lug 36 or 42. The upper portion of the inverted U-shaped member 30 is shaped for constituting a pusher handle for the vehicle.

A tubular side frame member 48 has one end pivotally secured at 50 to the U-arm 30a at a location appreciably above the U-arm pivot 32, the other end of member 48 being pivotally connected at 52 to the upper end of frame element 14. At the other side of the vehicle, a similar tubular side frame member 54 has one end pivotally secured at 56 to the U-arm 30b at a location generally in line with the pivot at 50, the other end of this member 54 being pivotally connected at 58 to the upper end of frame element 16.

A foot rest is indicated generally at 60, it being pivotally connected to the frame elements 10, 12, at 62 on element 10, and at 64 on element 12, the foot rest being swingable about said pivots 62, 64 between its position of Fig. 3 and its elevated position of Figs. 1 and 2, in which latter position it is supported by the pivoted U-member 66 whose bridge portion 67 engages over the hook elements 68 which are rigid on the footrest at the under side thereof. The foot rest may be dropped down from its Figs. 1 and 2 position to its Fig. 3 position by lifting the footrest a little and disengaging member 66 from hook elements 68, after which member 66 may be dropped by gravity about its pivotal axis at 69, and the footrest then may be dropped about its pivot 62, 64 into engagement with the front axle 22 or, as shown, into engagement with the bridge portion 67 of U-member 66 which, in its lower position, is stopped against the cross-brace member 70 of the frame.

The forward ends of the tubular side frame members 48, 54 are open, and U-arms 72a, 72b of a tubular U-member 72 are telescopically engaged in members 48, 54 whereby the member 72 may be pushed inward to its position of Fig. 3, and may be pulled outward to its extended position of Figs. 1 and 2. Any suitable releasable latching means may be provided for holding member 72 in each of its two operative positions, such as a spring-backed pin 74 within the end portion of each U-arm 72a, 72b for yieldingly engaging in one or the other of two holes 76, 78 provided in each of the tubular side frame members 48, 54, as shown in detail in Fig. 5.

A canopy is indicated generally at 80 removably mounted at upper portions of the arms 30a, 30b of pusher handle 30, the canopy having a frame which includes the depending elements 82, 84 (Fig. 7) at opposite sides of the canopy. Element 82 has two spaced lugs or pins 82', 82" extending outwardly thereon for being engaged in correspondingly spaced holes 29', 29" in pusher arm 30a. Similarly, the depending element 84 has two outwardly extending spaced lugs or pins 84', 84" thereon for being engaged in the spaced holes 30', 30" in pusher arm 30b. The elements 82, 84 are resiliently yieldable toward each other to enable the lugs or pins 82', 82" and 84', 84" to be engaged in said holes in the pusher arms. Also, when the vehicle is to be collapsed to folded condition, one lug or pin on each element 82, 84 may be disengaged from the adjacent pusher arm to condition the canopy for swinging about a single axis in the folding process.

A rectangular seat 86 is supported by the U-bracket 88 and the inverted U-bracket 90. Bracket 88 is suspended by its U-arms from the pivotal connections at 18, 20 of the crossing frame elements 10, 12, 14, 16, with its bridging portion extending transversely of the vehicle and secured to the under side of the seat 86. Bracket 90 has its U-arms pivotally connected at 92, 94 to the frame elements 14, 16 with its bridging portion extending transversely of the vehicle and secured to the under side of the seat. Two rigid strap elements 96, 98 are secured to the under side of seat 86 along opposite side margins thereof, and each strap element extends beyond the rear edge of the seat and has hinged connection to an adjustable back member 100, at 102 and 104 respectively. A foot-depressible latch frame is indicated generally at 106 extending rearwardly from the under side of seat 86. Frame 106 comprises two similar side members 108, 110 secured at their forward ends to the under side of seat 86, and a transverse member 112 secured to the rear ends of members 108, 110 somewhat rearward of the hinged lower portion of back member 100. Each of the latch frame members 108, 110 has a relatively deep notch 114 open at its upper side, and two rigid latch bars 116, 118 on back member 100 have their lower ends projecting below the back member in positions to be engaged, one in the notch 114 of member 108 and the other in notch 114 of member 110, for releasably latching back member 100 in its generally upright position of Figs. 2, 3 and 6. Foot-depression of the latch frame at the transverse member 112 thereof releases the back member 100 for movement thereof about its hinges 102, 104 to its generally horizontal position of Fig. 1, and as shown by dotted lines in Fig. 6.

The body walls of the vehicle, when set up for serving as a carriage, as in Fig. 1, are of flexible sheet material which is removably associated with the seat, back member and frame elements to provide the protective body walls as seen in Fig. 1, or the body material may be folded to provide a padded seat and back member when the vehicle is set up for serving as a stroller as shown in Fig. 3.

Referring to Fig. 8, three padded bottom sections of the removable flexible body are indicated at 120, 122 and 124 hinged together for folding on the transverse fold lines 121, 123. Another padded section 126 is hinged to section 124 at the transverse fold line 127, and this section preferably has a stiffener therein with the padding on the outer side of the stiffener.

Limp sheet material extends upward from the opposite side edges of sections 120, 122, 124 for constituting the side wall portions 128, 130 and 132, 134 of the vehicle body of Fig. 1, and similar limp sheet material extends upward from the forward edge of section 120 for constituting the front wall 136 of the body. Section 126 assumes a generally vertical position for constituting, with the limp extension part 129, the rear wall of the body.

Section 122, at its under side, has a pocket at 138 for reception of the forward edge margin of seat 86, and section 124 has a deeper pocket at its under side as indicated at 140, for reception of the back member 100.

Each side wall portion 128, 132 has snap fastener elements 142, 144, 146 thereon which are operable at the outer surfaces of the wall portions, and the side wall portions 130, 134 each has snap fastener elements 148, 150, 152, 154 thereon. The front wall 136 has two pairs of snap fastener elements 156, 158 thereon.

The upper edge margin of front wall 136 is adapted to be turned outwardly and downwardly over the bridge portion of U-member 72 when the latter is in its extended position of Fig. 1, and to be secured by coaction of the snap elements of each pair of the elements 156, 158. Similarly, the upper edge margins of the side wall portions 128, 132 are adapted to be turned outwardly and downwardly over the U-arms 72a, 72b, respectively, of extended tubular U-member 72, and to be secured by coaction of the snap elements 142, 144.

The forward part of each side wall portion 130, 134 also is adapted to be turned outwardly and downwardly over the side frame members 48 and 54, respectively, and to be secured by coaction of the snap fastener elements 150, 152. Also, the snap elements 146 on side wall portions 128, 132 coact with snap elements 148 on wall portions 130, 134, for securing the separate wall portions together.

The rearmost snap element 154 on each wall portion 130, 134 is located and adapted for coaction with a snap element 160 of which one is mounted on each of the depending elements 82, 84 of the frame of canopy 80.

The depending rear portion of canopy 80 may be stiffened by a pivoted member 85, and this stiffened portion may extend inside of the extension part 129 of the rear body wall for stabilizing and shaping the upper portions of the said wall.

When it is desired to convert the carriage of Fig. 1 into a stroller as shown in Fig. 3, the body material may be un-snapped and the side wall and front wall portions folded inward upon the bottom sections and rear wall sections, after which the back member 100, with section 124 thereon, may be raised and latched in its generally upright position of Figs. 2, 3 and 6. Then rear wall section 126 is folded inward upon section 124, and section 120 is folded inward upon section 122, to provide a padded seat and back for the stroller of Fig. 3. Adjustable U-member 72 next will be pushed inward to its position of Figs. 3 and 6, and foot rest 60 will be released to its lower position of Figs. 3 and 6. A narrow strip part or strap 162 at the under side of section 120 has one end secured at the fold line 121, and has length for extending up and around the bridge portion of U-member 72 with cooperating snap elements 164, 166 for securing it as shown in Fig. 3. It may be tucked under seat 86 when not in use.

When the latch members 38, 44 are released, the pusher handle 30 may be swung forward about pivots 32, 34 to collapse or fold the vehicle, in a conventional manner, to a generally flat compacted condition, the back member 100 being unlatched for folding inward upon the folded seat sections 120, 122.

It will be understood that various changes in details of the disclosed structure may be made within the scope of the appended claims, and it is intended that the patent shall cover, by suitable expression in the appended claims, whatever features of patentable novelty exist in the invention disclosed.

I claim as my invention:

1. A baby vehicle comprising a frame for supporting a seat element, tubular parallel arm rest members above and at opposite sides of the seat element, a foot rest pivotally mounted on said frame with its pivot close to the under margin of the forward edge of said seat element, said foot rest being movable about its pivot between a stroller position in which it extends at an incline downwardly and forwardly relative to said forward edge of the seat and an elevated position in which it extends forwardly generally in a horizontal plane which is only slightly below the plane of said seat element, means for releasably maintaining the foot rest in its said elevated position, a U-shaped member having parallel U-arms connected by a generally straight bridging portion, each said U-arm being telescopically associated with a different one of said arm rest members whereby the U-shaped member is movable between an inner position wherein its said bridging portion extends transversely of the vehicle relatively close to the vertical plane of the forward edge of said seat element and a forward position in which said bridging portion extends transversely of the vehicle generally vertically above the forward end of said foot rest in the said elevated position of the latter, a vehicle body having two hinged together padded bottom sections for resting, respectively, on said seat and on said foot rest when the latter is in its said elevated position, and having side wall portions and a forward end wall portion of flexible sheet material, means for detachably connecting upper parts of said flexible sidewall portions to said U-arms when the U-shaped member is in its forward position and for detachably connecting upper parts of said forward wall portion to said bridging portion of the U-shaped member when the latter is in its said forward position, said flexible side wall and forward end wall portions, when detached, being foldable inward upon said bottom sections and the foremost of said bottom sections being foldable rearwardly upon the next adjacent bottom section with said folded flexible walls between them to provide a padded stroller seat when said U-shaped member is moved to its said inner position and said foot rest is released to its said inclined position.

2. A baby vehicle as defined in claim 1, wherein a back rest member is hingedly mounted relative to the rear edge of said seat element and is movable between a lower position in which it constitutes a rearward extension of said seat element and a generally upright position, said vehicle body having rearward side wall portions of flexible sheet material detachably connected to said frame and arm rests and having a rear end wall, said rearward side wall portions, when detached, being foldable inward upon said back rest member, and said rear end wall being foldable forwardly upon said back rest member with said folded flexible rear side walls between them to provide a padded back rest member for a stroller when the back rest member is elevated to its said substantially upright position.

3. A baby vehicle as defined in claim 1, wherein a back rest member is hingedly mounted relative to the rear edge of said seat element and is movable between a lower position in which it constitutes a rearward extension of said seat element and a generally upright position, said vehicle body having rearward side wall portions of flexible sheet material detachably connected to said frame and arm rests and having a rear end wall, said rearward side wall portions, when detached, being foldable inward upon said back rest member, and said rear end wall being foldable forwardly upon said back rest member with said folded flexible rear side walls between them to provide a padded back rest member for a stroller when the back rest member is elevated to its said substantially upright position, said vehicle body having a bottom padded section, for resting on said back rest, hinged to said section which rests on said seat element, said rear end wall being hinged to said section which rests on the back rest, said padded sections for the back rest member and seat element having means thereon for removably securing them to said back rest member and seat element respectively.

4. A baby vehicle convertible between a baby carriage and a stroller, comprising a chassis having a rectangular seat element mounted thereon and a pusher handle at the rear of the chassis, a rectangular back rest element hingedly connected to the seat element at the rear edge of the latter and movable about the axis of the hinge between a carriage position in which it may be disposed approximately in the plane of the seat element as a rearward extension of the latter, and a stroller position in which it may be disposed generally upright, a foot rest pivotally mounted on the chassis with its pivot below and relatively close to the forward edge of said seat element, said foot rest being swingable about its pivot between a lowered, inclined, stroller position, and an upper carriage position in which it is substantially in a horizontal plane for constituting a forward extension of said seat element, a pair of tubular side frame elements mounted on said chassis substantially above the plane of said seat element and disposed generally horizontally at opposite sides of the vehicle, a generally U-shaped member having parallel legs, each telescopically associated with a different one of said side frame elements, whereby said U-shaped member may be moved between an inner stroller position, and a forward carriage position in which the bridging portion of said U-shaped member is a substantial distance forwardly of said seat element, and a vehicle body unit of flexible sheet material having flexible side walls and a flexible forward end wall and four hinged together relatively foldable sections of which three adjacent sections constitute padded bottom sections for resting on said foot rest, seat element and back rest element, respectively, when the foot rest and back rest element are in their said carriage positions, and the fourth section constitutes a rear end wall of the body unit, upper margins of forward portions of said side walls being releasably attachable to said side frame elements, and rear portions of the side walls being detachably suspendable from said pusher handle and serving to maintain said rear end wall in generally upright position, said forward end wall having upper marginal portions releasably attachable to the bridge portion of said U-shaped member in the forward position of the latter, and said flexible side wall portions and forward end wall, when detached, being foldable inward upon adjacent bottom sections of said body unit, said rear end wall and said end walls being foldable over upon the adjacent bottom section which is on said back rest element to provide with said element a padded back rest in the generally upright stroller position of said element, the foremost one of said bottom sections of the body unit being foldable over upon the adjacent bottom section which is on said seat element to provide a padded seat for the vehicle in its stroller condition, said flexible side wall and forward end wall material serving as obscured padding for said back rest and seat.

References Cited in the file of this patent

UNITED STATES PATENTS

| Re. 23,488 | Raucher | Apr. 29, 1952 |
| 2,709,478 | Golding | May 31, 1955 |
| 2,781,225 | Heideman | Feb. 12, 1957 |
| 2,783,053 | Sheldrick | Feb. 26, 1957 |

FOREIGN PATENTS

| 257,798 | Great Britain | Sept. 9, 1926 |